Jan. 31, 1928.
T. E. RAINES
1,657,937
POWER TRANSMISSION JACK
Filed Dec. 1, 1925
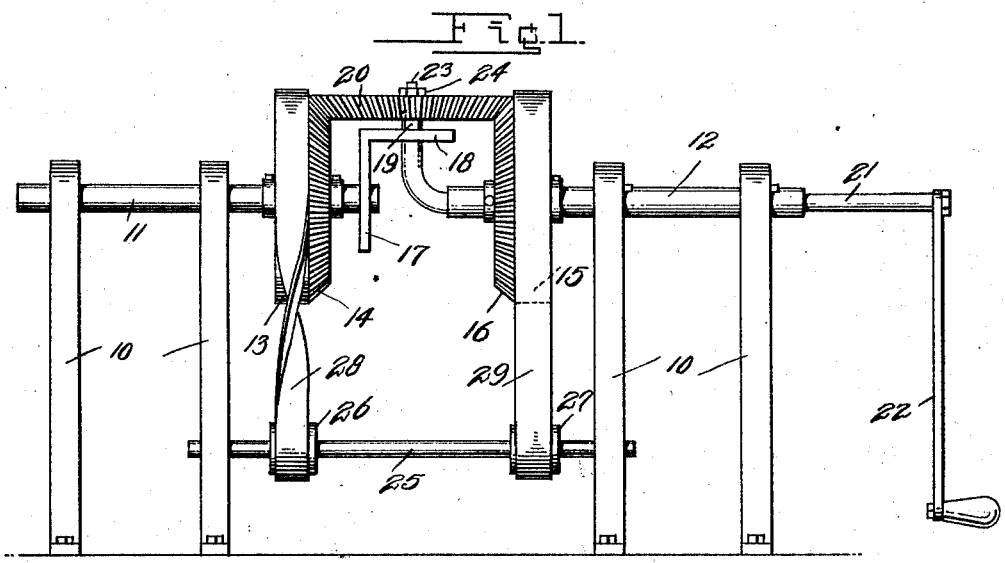
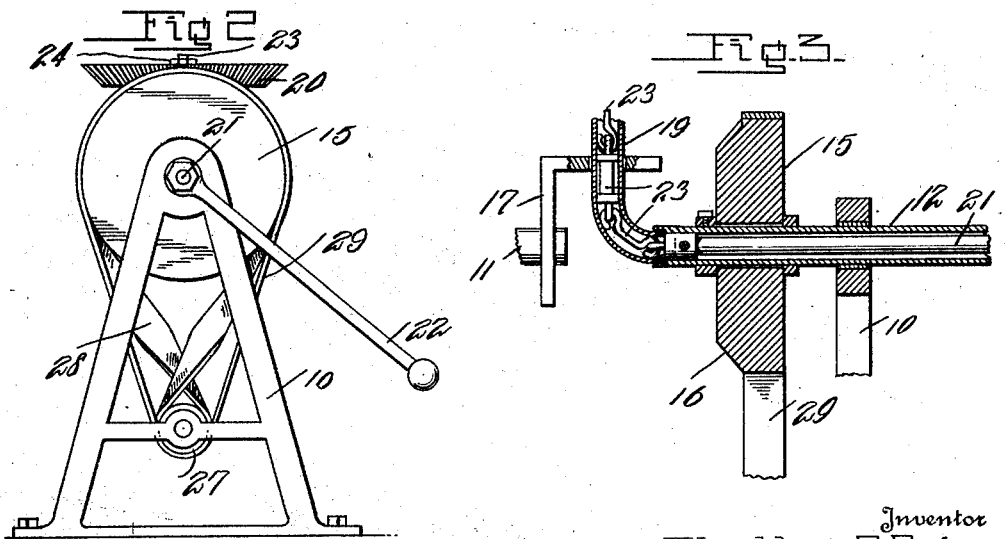
Inventor
Thaddeus E. Raines
By Lancaster and Allwine
Attorneys Patented Jan. 31, 1928.

1,657,937

UNITED STATES PATENT OFFICE.

THADDEUS EUGENE RAINES, OF POMPANO, FLORIDA.

POWER-TRANSMISSION JACK.

Application filed December 1, 1925. Serial No. 72,551.

The present invention relates to machine elements, and more particularly to an improved transmission gearing.

An object of this invention is to provide a power transmitting jack or gearing which may be used for an increase or decrease of speed of the driven shaft with respect to the drive shaft, and which provides a means for balancing the mechanism to provide a steady and uniform transmission between a hand crank and a shaft or shafts to be turned.

A further object of the invention is to provide drive and driven shafts with means for operating the shafts by a hand crank and transmitting the motion thereof in a steady and uniform manner to a driven shaft without the use of external devices, and a means which admits of the application of the turning force to the driven shafts at spaced points so that the latter may be constructed in one or more parts according to the use to which the present device may be put.

Another object of the invention is to provide a power transmitting jack of this character which comprises but few parts adapted to be driven with ease and the parts of which may be economically manufactured and easily assembled.

The above and various other objects and advantages of this invention will in part be described in and in part be understood from the following detailed description of the present preferred embodiment, the same being illustrated in the accompanying drawing, wherein:

Fig. 1 is a side elevation of a power transmission jack constructed according to the present invention.

Fig. 2 is an end elevation of the same, and

Fig. 3 is a fragmentary sectional view taken longitudinally through a portion of the device showing the power shaft connection.

Referring to the drawing 10 designates a plurality of uprights or bearings of suitable height, and preferably spaced axially in pairs at opposite ends of the device. Each pair of uprights 10 is provided with a shaft, the shafts being designated as 11 and 12 and arranged in axial alignment and spaced apart at their inner ends at the central portion of the device. The axle 11, or shaft, carries a pulley 13 upon the inner face of which is mounted a bevel gear wheel 14. The shaft 12 is provided upon its inner end with a second pulley 15 of the same diameter as that of the pulley 13, and which is also provided with a bevel gear wheel 16 corresponding in size to the gear wheel 14.

The inner end of the shaft or axle 11 extends beyond the gear wheel 14 and supports a pivoted bracket 17 of angle construction which has an outer bearing portion 18 supporting an intermediate shaft 19 at right angles to the axis of the shafts 11 and 12 and which is supported by the bracket 17 between the gear wheels 14 and 16. An intermediate bevel gear wheel 20 is disposed in mesh with the gear wheels 14 and 16 and is mounted on the shaft 19. The shaft 19 and the bracket 17 holds the gear wheel 20 in mesh with the gear wheels 14 and 16 and permits the gear wheel 20 to revolve upon the gear wheels 14 and 16 with its shaft 19 disposed radially at all times.

Mounted to turn in the shaft 12 is a drive shaft 21 provided upon its outer end with a handle 22 or the like by means of which the drive shaft may be turned. The drive shaft 21 is connected at its inner end to a flexible shaft 23 which is housed within the radial shaft 19 and which is gradually curved at its inner end into axial alignment with the shaft or axle 12 and coupled thereto. The gear wheel 20 turns upon the upper end of the shaft 19 and is connected to the flexible shaft 23 by a nut 24 or the like. The inner end of the shaft 19 is freely rotatable upon the shaft 12.

The inner opposite uprights 10 serve as bearings or supports for a driven shaft 25 which is disposed in parallel relation to the axis of the shafts 11 and 12. Spaced pulleys 26 and 27 are mounted upon the shaft 25, are relativelly small, and are disposed in line with the relatively large pulleys 13 and 15 respectively. Drive belts 28 and 29 are placed over the respective pairs of pulleys 13 and 26, and 15 and 27, the belt 28 being twisted to reverse the relative directional movements of the pulleys 13 and 26. This arrangement of the belt may be made with respect to the other pair of pulleys, it merely being necessary that one of the belts drive one of the small pulleys from an opposite direction.

In operation, the handle 22 is swung to turn the shaft 21, the flexible shaft 23 and the intermediate gear wheel 20. One side of the gear wheel 20 turns the gear wheel 16 with its pulley 15 in one direction, while the other side of the gear wheel 20 turns the opposite gear wheel 14 with its pulley 13 in an opposite direction.

Unless means were provided for connecting the gear wheels 14 and 16 together, there would be a tendency for the gear wheel 20 to swing about one of the lateral gear wheels, 14 or 16, provided there was sufficient frictional resistance to turning of one lateral gear wheel over the other. To prevent this, however, the drive shaft 25 is provided and the belts 28 and 29 transmit the opposite rotary movement of the lateral gear wheels 14 and 16 into a rotary motion of the shaft 25 in one direction. The power imposed on the gear wheel 20 is thus divided and transmitted evenly through the spaced driving belts 28 and 29. The transmission through the jack is therefore uniform and the relative diameters of the gear wheels and pulleys may be so proportioned as to obtain the desired speed and power of the driven shaft 25.

By means of this transmission jack the gear wheels used may be relatively light and small proportionately to the load placed on the jack, and power may be taken off from any part of the driven shaft, but preferably from a point intermediate the pulleys 26 and 27 so that the pressure on the shaft 25 is distributed toward opposite ends thereof and at opposite sides of the point of application or take off of the power.

A relatively smooth running and well balanced transmission device is provided which is susceptible to variations in the proportions of its parts to adapt the device to various conditions of application and use.

It is of course understood that various changes and modifications may be made in the details of construction and design of the above specifically described embodiment of this invention without departing from the spirit thereof, such changes and modifications being restricted only by the scope of the following claims.

What is claimed is:

1. A power transmission jack comprising spaced coaxial shafts, a radial shaft mounted on the inner end of one of the coaxial shafts, lateral gears mounted on the inner ends of the coaxial shafts, an intermediate gear intermeshing with the lateral gears and mounted on said radial shaft, a bracket mounted rotatably on the inner end of the other coaxial shaft and supporting the radial shaft, a flexible drive connection located in the radial shaft for imparting movement to the intermediate gear and thru it to turn said lateral gears in opposite directions, means for turning said flexible drive connection, a driven shaft, and reversely operating connections between the driven shaft and said lateral gears.

2. A power transmission jack comprising spaced coaxial shafts, lateral gears mounted on the inner ends of the shafts, a radial shaft mounted on the inner end of one of the coaxial shafts, an intermediate gear intermeshing with the lateral gears and mounted on said radial shaft, a bracket rotatably mounted on the inner end of the other coaxial shaft and supporting the radial shaft, a flexible drive connection for the intermediate gear extending through the radial shaft and the adjacent coaxial shaft, a driven shaft, and reversely operating drive connections between the lateral gears and the driven shaft.

3. A power transmission jack comprising a pair of spaced coaxial shafts, a bevel gear wheel on the inner end of each shaft, a pulley mounted on each gear wheel, a bracket mounted upon the inner end of one of said shafts, a radial shaft mounted in the bracket, a bevel gear wheel mounted on the radial shaft and intermeshing with said first gear wheel, an operating shaft mounted in said radial shaft and connected to the gear wheel thereon and extending through one of said coaxial shafts, a handle on the outer end of the operating shaft for turning the same, a driven shaft, a pair of spaced pulleys on the driven shaft arranged in alignment respectively with the pulleys on said gear wheels, and belts connecting the aligned pulleys with one belt twisted for reverse operation to the other belt.

4. A power transmission jack comprising spaced coaxial shafts, a radial shaft mounted on the inner end of one of the coaxial shafts, lateral gears mounted on the inner ends of the co-axial shafts, an intermediate gear intermeshing with the lateral gears and mounted on said radial shaft, a flexible drive carried by the radial shaft and its supporting shaft for imparting movement to the intermediate gear and thru it in turn to said lateral gears in opposite directions, means for turning said flexible drive, a driven shaft, and reversely operating connections between the driven shaft and said lateral gears.

THADDEUS EUGENE RAINES.